United States Patent [19]
Juvet

[11] Patent Number: 5,602,216
[45] Date of Patent: Feb. 11, 1997

[54] PROCESS AND APPARATUS FOR PERFORMING A POLYMERISATION IN A TUBE REACTOR

[75] Inventor: Jacques Juvet, Aesch bei Neftenbach, Switzerland

[73] Assignee: Sulzer Chemtech AG, Winterthur, Switzerland

[21] Appl. No.: 681,437

[22] Filed: Jul. 22, 1996

[30] Foreign Application Priority Data

Jul. 26, 1995 [EP] European Pat. Off. .............. 95810486

[51] Int. Cl.$^6$ ...................................................... C08F 2/02
[52] U.S. Cl. .................... 526/64; 526/68; 526/329.7; 526/347.2; 422/135
[58] Field of Search .......................... 526/64, 68, 329.7, 526/347.2; 422/135

[56] References Cited

U.S. PATENT DOCUMENTS 5,194,525  3/1993  Miura et al. ................ 526/94
5,391,655  2/1995  Brandstetter et al. .............. 526/94

FOREIGN PATENT DOCUMENTS 0021341  1/1981  European Pat. Off. .
0096201  12/1983  European Pat. Off. .

*Primary Examiner*—Thomas R. Weber
*Attorney, Agent, or Firm*—Townsend and Townsend and Crew LLP

[57] ABSTRACT

The process for carrying out a polymerization in a tube reactor (1) comprises the following steps: Freshly introduced monomer (M) is mixed with a returned monomer-polymer mixture. The mixture is cooled to a prescribed initial temperature (heat exchanger 4). A polymerization starter (S) which is inactivatable upon heating above a decomposition temperature is admixed. A partial polymerization takes place in the tube reactor. The mixture leaving the tube reactor is heated up to at least the said decomposition temperature (heat exchanger 2). Finally, a portion of the mixture is returned (pump 3) and the other portion removed as product (P).

8 Claims, 1 Drawing Sheet

PROCESS AND APPARATUS FOR PERFORMING A POLYMERISATION IN A TUBE REACTOR

The invention relates to a process for carrying out a polymerisation in a tube reactor. It also refers to an apparatus for carrying out the process as well as to corresponding uses.

Polystyrenes and copolymers, polyacrylates such as PMMA and other products can be polymerised by means of ionic initiation. This initiation is brought about by anionic or cationic starter substances which are mixed into the monomer. Such starter substances, called starters for short, are temperature sensitive and decompose if the temperature exceeds, for example, 150° C.

Metal-organic compounds known as starter substances are: sec butyl-lithium ($C_4H_9Li$) and cumyl-potassium ($C_9H_{11}K$) for the manufacture of polystyrene, diphenylmethyl-potassium ($C_{13}H_{11}K$), fluorenyl-potassium ($C_{13}H_9K$) and lithium chloride (LiCl) for the manufacture of polymethylmethylacrylate (PMMA).

The ionic polymerisation is rapid and highly exothermic. Due to the heat liberated the temperature can increase to beyond the decomposition temperature of the starter, whereupon the reaction ceases.

In order to carry out a continuous reaction, it is proposed to use a tube reactor in which the static mixer elements are arranged to be cross section filling (cf. EP 0 096 201). Since, however, the polymerisation is associated with a strong increase in viscosity, problems arise which can lead to non-uniform product quality. As a result of the axial viscosity gradient a segregation can develop in which strongly polymerised, highly viscous phases can separate out from the less polymerised phases of lower viscosity in the mixture. Furthermore, the formation of a deposit on the reactor walls can also contribute to insufficiency of the product quality.

It is thus the object of the invention to provide a continuous process for the ionic polymerisation which leads to an improved product quality. This object is satisfied by the features of claim 1. In this process the axial viscosity gradient in a tube reactor is compensated for by a returned reaction product which still consists of unreacted monomers to a considerable extent. In order to prevent polymerisation from occurring in the return line, which would have a disturbing influence on the carrying out of the process, the starter is thermally annihilated at the outlet of the reactor.

The dependent claims 2 to 4 relate to advantageous embodiments of the process in accordance with the invention. Claims 5 to 7 relate to apparatuses for carrying out the process in accordance with the invention, and claim 8 relates to corresponding uses.

BRIEF DESCRIPTION OF THE DRAWINGS

In the following the invention will be explained on the basis of the drawings. Shown are.

Figure 1:
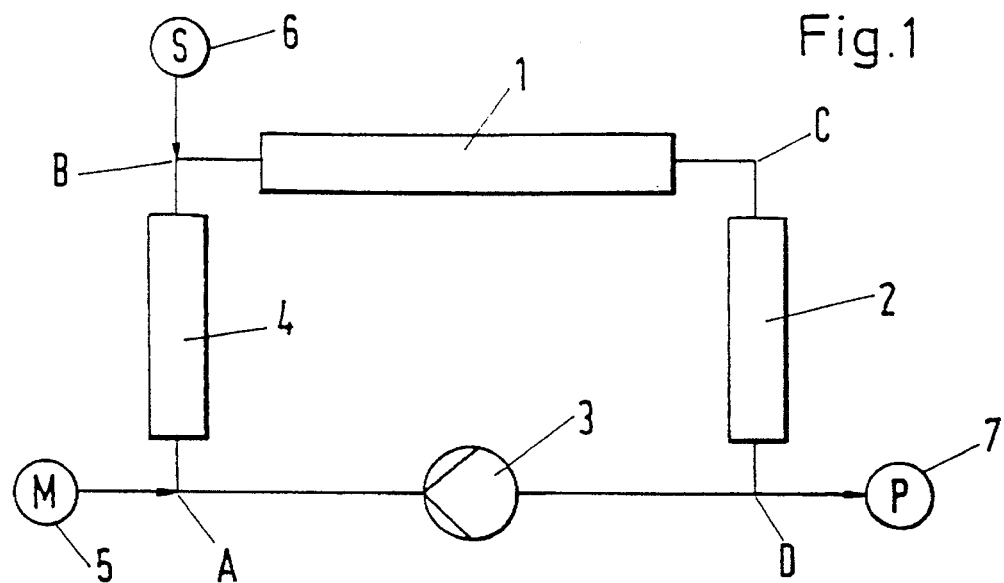
FIG. 1 a schematic representation of the installation for carrying out the process in accordance with the invention, and FIG. 2 a diagram with the schematically represented plot of the temperature and the viscosity in the installation of FIG. 1
Figure 2:
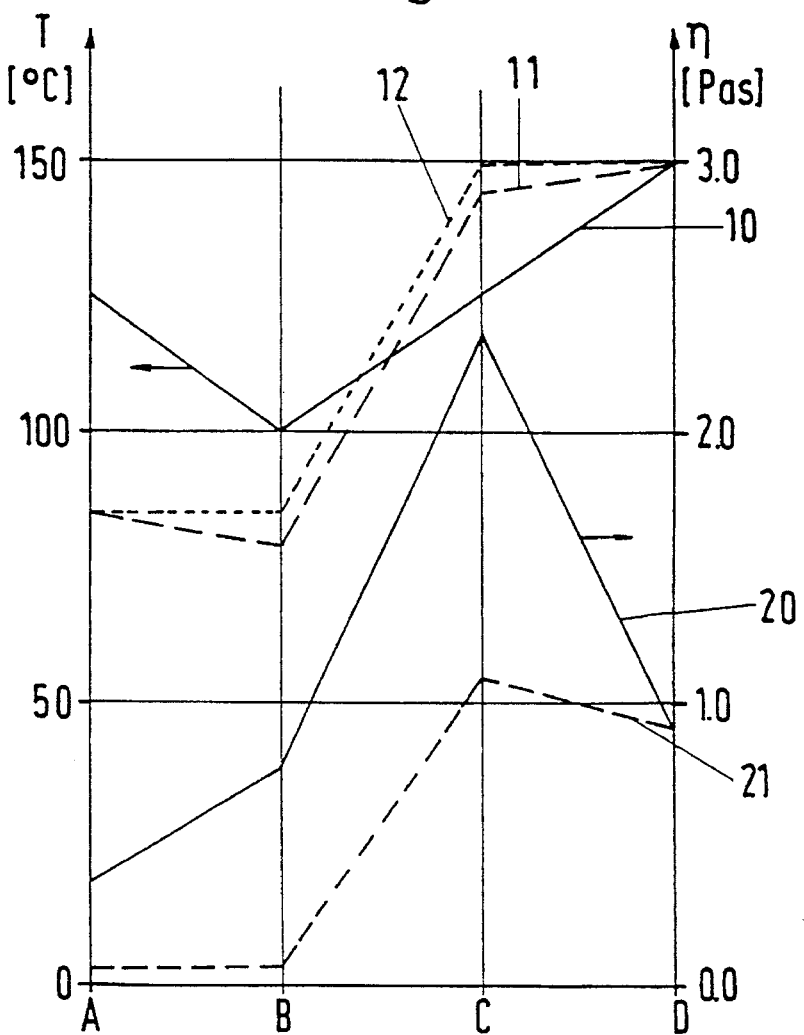

The scheme of FIG. 1 shows: a tube reactor 1, a mixer-heat exchanger 2 for heating the product, a pump 3, a mixer-heat exchanger 4 for cooling the mixture to be fed into the reactor 1, a supply point 5 for a monomer M, a supply point 6 for a starter S and a removal point 7 for the product produced in accordance with the invention. The temperature and viscosity values are shown in the drawing of FIG. 2 for two embodiments for the points A, B, C and D.

The solid curves 10 (temperature) and 20 (viscosity) are associated with the first embodiment. The product P contains equal parts of polymer and monomer, namely 2.7 kg/h of each. At point D, 26.4 kg/h of this polymer-monomer mixture leaves the heat exchanger 2. Of this, 21.6 kg/h is returned via the pump 3 to point A, where 5.4 kg/h of monomer M is admixed. The temperature of this mixture is 124° C. at A. The temperature is lowered to 100° C. in the cooler 4 between A and B. Thereafter, starter S is admixed at B. In the reactor tube 1 the temperature rises due to the liberated reaction heat to 126° C. (point C). By heating in the heat exchanger 2, the temperature of the product is finally raised to 150° C. At this temperature the starter S decomposes. As the curve 20 shows, the viscosity increases in the reactor 2 between B and C from 0.78 to 2.37 Pa s ($Ns/m^2$), that is approximately threefold.

Whereas in the first exemplary embodiment the degree of transformation (=ratio of the amount of the monomer to the total amount) increases from 40 to 50% during the reaction, provision is made in the second example—dashed curves 11 and 12—that the degree of transformation increases from 25 to 50%. Here the viscosity in the reactor 1 increases from 0.064 to 1.097 Pa s, i.e. by about a factor of 17. This ratio is disadvantageously high; it should preferably not be greater than 10.

As the curve 12 for the second exemplary embodiment shows, the product would just have the decomposition temperature (150° C.) after the reactor if no cooling took place between A and B. In this case the cooler 4 and the heater 2 could be dispensed with. It is however not recommendable to provide this special execution of the process, since, on the one hand, a large increase in viscosity is present and, on the other hand, it would be difficult to carry out a control of the process.

For a given mixing ratio of returned product and freshly introduced monomer an initial temperature is preferably provided by the heat exchanger 4 in such a manner that the temperature of the mixture at the outlet of the tube reactor lies at least 5 K. below the decomposition temperature.

The tube reactor 1 advantageously has mixer elements whose structure is built up of intermeshing arms which cross one another, with the arms forming two groups of structure elements aligned in parallel (cf. DE-PS 28 08 854).

For the mixer-heat exchangers 2 and 4 an apparatus is preferably chosen as known from DE-PS 28 39 564: This apparatus is a static mixer with arms which are executed as heat exchanger tubes.

I claim:

1. Process for carrying out a polymerisation in a tube reactor comprising the following steps:
   mixing a freshly introduced monomer with a returned monomer-polymer mixture as well as cooling the mixture to a prescribed initial temperature,
   admixing an inactivatable polymerisation starter, the inactivation of which begins when heated above a decomposition temperature, as well as performing a partial polymerisation in the tube reactor,
   heating the mixture leaving the tube reactor to at least the said decomposition temperature, and finally
   returning a portion of the mixture and removal of the other portion as product.

2. Process in accordance with claim 1 characterised in that at least half of the mixture at the outlet of the tube reactor is present in polymerised form.

3. Process in accordance with claim 1 characterised in that the amount of the returned mixture is chosen in relation to the amount of monomer introduced in such a manner that the viscosity of the mixture in the tube reactor during polymerisation does not increase by more than approximately a factor of ten.

4. Process in accordance with claim 1 characterised in that for a given mixing ratio of returned mixture and freshly introduced monomer an initial temperature is prescribed so that the temperature of the mixture at the outlet of the tube reactor lies at least 5 K. below the decomposition temperature.

5. Apparatus for carrying out the process in accordance with claim 1 comprising the following components:

a tube reactor (I) with static mixer elements arranged so as to be space filling, at least one mixer-heat exchanger (4, 2) at each of the input side and the output side of the tube reactor, a return line with pump (3) for a first portion of the mixture, further a supply point (5) for a monomer (M) after the feedback pump (3), a supply point (6) for a starter (S) after the input-side mixer-heat exchanger (4) as well as a product removal point (7) for a second portion of the mixture (P) after the mixer-heat exchanger (2) at the output side.

6. Apparatus in accordance with claim 5 characterised in that the tube reactor (1) has mixer elements with a structure which is built up of arms crossing and intermeshing with one another, where the arms form two groups of structure elements directed parallel to one another.

7. Apparatus in accordance with claim 5 characterised in that the mixer-heat exchangers (2, 4) are static mixers with arms which are formed as heat exchanger tubes.

8. The apparatus according to claim 5 for the manufacture of polystyrene or PMMA, where sec-butyl-lithium or LiCl respectively is used as an ionic starter.

* * * * *